United States Patent [19]

Katsube

[11] Patent Number: 4,984,264
[45] Date of Patent: Jan. 8, 1991

[54] CALL ADMISSION CONTROL METHOD AND CELL FLOW MONITORING METHOD IN THE SAME METHOD

[75] Inventor: Yasuhiro Katsube, Kawasaki, Japan

[73] Assignee: Kabushiki Kaisha Toshiba, Kawasaki, Japan

[21] Appl. No.: 482,018

[22] Filed: Feb. 20, 1990

[30] Foreign Application Priority Data

Feb. 22, 1989 [JP] Japan ................................. 1-40199

[51] Int. Cl.$^5$ ............................................. H04M 3/36
[52] U.S. Cl. ................................... 379/197; 379/220; 379/95; 370/54
[58] Field of Search ................ 379/111, 133, 134, 188, 379/196, 197, 220, 243, 93, 94, 95; 370/54

[56] References Cited

U.S. PATENT DOCUMENTS 4,696,029 9/1987 Cohen ................................... 379/93

FOREIGN PATENT DOCUMENTS

63-13546 1/1988 Japan .
63-38345 2/1988 Japan .
63-42543 2/1988 Japan .

*Primary Examiner*—Stafford D. Schrefver
*Attorney, Agent, or Firm*—Oblon, Spivak, McClelland, Maier & Neustadt

[57] ABSTRACT

In a network in which all information from terminals having various traffic characteristics is transmitted/switched by a fixed length block including a virtual channel id, a terminal requesting communication declares destination address information and traffic characteristics of the requested communication upon set-up to a network. The exchange in the network expresses traffic characteristics of an individual terminal and an offered load (estimated cell flow) in the network. The traffic characteristics of each terminal are expressed as a maximum cell flow generated from the terminal in time units $\Delta(i)$ ($i = 1, 2, \ldots, n$) having n predetermined lengths. The predicated offered load of the line supposing that a new request call is accepted is expressed as an estimated cell flow predicted to be transmitted to the line in the time unit $\Delta t(i)$ by using traffic characteristic values of the calls currently transmitting on the line and a new request call. In a call admission control method, the estimated cell flow is compared with a maximum allowable cell flow obtained from a circuit capacity, thereby determining "accept" or "reject" of admission of the request call. In a cell flow monitoring method, a cell flow generated from a terminal in time units $\Delta t(i)$ is counted in a plurality of time units $\Delta t(i)$. If a cell flow in any one time unit $\Delta t(i)$ exceeds a traffic characteristic value grasped beforehand by a network, "violation" is determined for the terminal and a regulation sequence is performed.

3 Claims, 7 Drawing Sheets

| TIME UNIT \ CALL | $\Delta t(1)$ | $\Delta t(2)$ | $\Delta t(3)$ | $\Delta t(4)$ |
|---|---|---|---|---|
| FLOW OF CALL 1 | $a(1,1)$ | $a(1,2)$ | $a(1,3)$ | $a(1,4)$ |
| FLOW OF CALL 2 | $a(2,1)$ | $a(2,2)$ | $a(2,3)$ | $a(2,4)$ |
| FLOW OF CALL j | $a(j,1)$ | $a(j,2)$ | $a(j,3)$ | $a(j,4)$ |
| FLOW OF CALL k | $a(k,1)$ | $a(k,2)$ | $a(k,3)$ | $a(k,4)$ |
| TOTAL MAX FLOW | $\sum_{j=1}^{k} a(j,1)$ | $\sum_{j=1}^{k} a(j,2)$ | $\sum_{j=1}^{k} a(j,3)$ | $\sum_{j=1}^{k} a(j,4)$ |
| COEFFICIENT $\alpha$ | $\alpha(1)$ | $\alpha(2)$ | $\alpha(3)$ | $\alpha(4)$ |
| ESTIMATED-CELL FLOW OF LINE $A(i)$ | $A(1)$ | $A(2)$ | $A(3)$ | $A(4)$ |
| MAXIMUM ALLOWABLE CELL FLOW | $A_{max}(1)$ | $A_{max}(2)$ | $A_{max}(3)$ | $A_{max}(4)$ |

$(0 < \alpha(i) \leq 1)$

F I G. 4A

CURRENT = LOAD $(i = 1, 2, 3, 4, \ldots, n)$
$(j = 1, 2, \ldots, k)$

| CALL \ TIME UNIT | $\Delta t(1)$ | $\Delta t(2)$ | $\Delta t(3)$ | $\Delta t(4)$ |
|---|---|---|---|---|
| FLOW OF CALL 1 | $a(1,1)$ | $a(1,2)$ | $a(1,3)$ | $a(1,4)$ |
| FLOW OF CALL 2 | $a(2,1)$ | $a(2,2)$ | $a(2,3)$ | $a(2,4)$ |
| FLOW OF CALL j | $a(j,1)$ | $a(j,2)$ | $a(j,3)$ | $a(j,4)$ |
| FLOW OF CALL k | $a(k,1)$ | $a(k,2)$ | $a(k,3)$ | $a(k,4)$ |
| FLOW OF CALL k+1 (NEW-CALL) | $a(k+1,1)$ | $a(k+1,2)$ | $a(k+1,3)$ | $a(k+1,4)$ |
| TOTAL MAX FLOW | $\sum_{j=1}^{k+1} a(j,1)$ | $\sum_{j=1}^{k+1} a(j,2)$ | $\sum_{j=1}^{k+1} a(j,3)$ | $\sum_{j=1}^{k+1} a(j,4)$ |
| COEFFICIENT $\alpha_{new}$ | $\alpha_{new}(1)$ | $\alpha_{new}(2)$ | $\alpha_{new}(3)$ | $\alpha_{new}(4)$ |
| ESTIMATED-CELL FLOW OF LINE $A'(i)$ | $A'(1)$ | $A'(2)$ | $A'(3)$ | $A'(4)$ |
| MAXIMUM ALLOWABLE CELL FLOW | $A_{max}(1)$ | $A_{max}(2)$ | $A_{max}(3)$ | $A_{max}(4)$ |

ESTIMATED LOAD = ($\alpha_{new}(i) < \alpha(i)$)

($i = 1, 2, 3, 4, \ldots, n$)
($j = 1, 2, \ldots, k, k+1$)

CALL ADMISSION CONTROL METHOD AND CELL FLOW MONITORING METHOD IN THE SAME METHOD

BACKGROUND OF THE INVENTION

1. Field of the Invention

The present invention relates to a call admission control method for properly allocating a network resource and a flow-monitoring method for monitoring traffic of terminals during communication in a network accommodating terminals having various traffic characteristics.

2. Description of the Related Art

In an asynchronous transfer mode network (generally called an "ATM-network") in which all communication information are subjected to transmission/switching by a fixed length block called a "cell" including a header having a virtual-channel id (VCI), information belonging to different virtual-channels on a line are statistically multiplexed by asynchronous cell multiplexing. Therefore, in accordance with amounts of information generated from terminals having various traffic characteristics, the network can dynamically allocate a transmission bandwidth and realize efficient transmission/switching.

In addition, a switching operation for each communication information can be performed at high speed by hardware since a virtual-channel id (VCI) is referred to for each cell. Therefore, this asynchronous transfer mode network has flexibility in bandwidth utilization of a conventional packet switching network and a real-time property of a conventional circuit switching network. As a result, communication including various types of media; for example, voice, still image, motion image, and high speed data is realized.

Transmission rates, however, of the communication information described above are different in respective terminals, and a generation form of the information tends to have burstiness. Therefore, a utilization state of network resources such as transmission-lines and switches varies dynamically. As a result, the network cannot perfectly grasp the utilization state of resources.

If the resource utilization state is not perfectly grasped, the network may excessively allocate a resource to a terminal or reject a call-setup request from a terminal even if an additional resource is present.

In the asynchronous transfer mode network, no flow-control is performed in a network unlike in conventional packet switching. Therefore, if a resource is excessively allocated to a terminal, the number of stored cells in a sending/receiving buffer of a switch is increased. As a result, transmission delay time is increased or a cell loss occurs to degrade communication quality. In the worst case, the network itself causes a congestion-state.

To the contrary, if a network keeps an unnecessarily large amount of resources and rejects an admissible call-setup request, the resources cannot be efficiently used to degrade admission quality of the call.

As described above, in the asynchronous transfer mode network, terminals have a wide range of transmission rates from low to high rates, and the traffic characteristics often have burstiness. Therefore, it is difficult to correctly grasp a change in network resource utilization state. For this and other reasons, proper network resource allocation capable of accepting call-set-up requests as many as possible within an allowable range as communication quality cannot be performed.

Therefore, the network, e.g., a switch must correctly grasp characteristics of the cell-flow of an individual call and sequentially, numerically express a predicted traffic-load of a line as one characteristic of cell-flow, thereby achieving maximum communication power of a network resource.

SUMMARY OF THE INVENTION

It is an object of the present invention to provide a call admission control method in which communication surplus power of a network resource is estimated by a method of estimating a predicted load state of a line as the estimated cell-flow expression assuming that a new request call is accepted, and proper network resource allocation capable of "accepting" CALL-REQs as many as possible within an allowable range of communication quality is executed thereby realizing a high-efficiency network having characteristics of asynchronous transfer mode communication, and to provide a cell flow monitoring method for constantly maintaining a network in a normal load state.

In order to achieve the above object, the present invention provides the following method.

In a network in which all communication information generated from terminals are transmitted/switched using virtual channel id (VCI) given to a cell-header of each "cell", a terminal requesting communication declares destination-address info. and traffic characteristics of the requested communication to a network upon, e.g., CALL-SETUP. On the basis of the declared destination-address info. and requested traffic characteristics and a current offered load in the network, the switch in the network determines a state of the network by a method of predicting an offered load in the network assuming that a new request call is accepted and comparing the predicted offered load with communication power of the network resource, and performs admission control processing for the request call.

A method of the call admission control system according to the present invention will be schematically described below.

A switch in network expresses and grasps a current offered load of an accommodated line as an estimated cell flow $A(i)$ ($i = 1, 2, \ldots, n$) to be transmitted to the line in time units $\Delta t(i)$ ($i = 1, 2, \ldots, n$) having a plurality of ($n$) predetermined lengths. The estimated cell flow $A(i)$ is calculated as follows.

A total-maximum flow in the time unit $\Delta t(i)$ is calculated by the following equation by using a maximum cell flow $a(j,i)$ ($i = 1, 2, \ldots, n$ and $j = 1, 2, \ldots, k$) for each call generated from a terminal in the time unit $\Delta t(i)$:

$$\text{total-maximum flow} = \sum_{j=1}^{k} a(j,i)$$

(where call $j = 1, 2, \ldots, k$)

The current estimated cell flow $A(i)$ in each time unit is calculated by the following equation from the total-maximum flow:

$$A(i) = \text{coefficient } \alpha(i) \times \text{total-maximum flow}$$

(where the coefficient is represented by $\alpha(i)$)

The coefficient α will be described in detail later. The maximum cell flow a(j,i) for each call may be declared as traffic characteristics directly, or a(j,i) may be a value calculated by a switch in a network on the basis of traffic characteristics declared by each call j by another expression method.

If a predicted offered load of a line obtained assuming that a new request call (k+1) is accepted is expressed as an estimated cell flow A'(i) (i=1, 2, ..., n) predicted to be transmitted to the line in the time unit Δt(i), a total-maximum flow in the time unit Δt(i) is similarly obtained by the following equation by using the maximum cell flow a(j,i) for each call:

$$\text{total-maximum flow} = \sum_{j=1}^{k+1} a(j,i)$$

(where call j=1, 2, ..., k, k+1)

Therefore, the estimated cell flow A'(i) obtained assuming that a request call is accepted is calculated by the following equation:

$$A'(i) = \text{coefficient } \alpha_{new}(i) \times \text{total-maximum flow}$$

(where the coefficient is represented by $\alpha_{new}(i)$)

If the communication power of the network is expressed as a transmittable maximum-allowable-cell-flow of line $A_{max(i)}$ obtained from a circuit capacity, accept or reject of the request call can be determined by checking whether the estimated cell flow A'(i) falls within the range of $A_{max(i)}$ (a so-called "call admission control system"). Since the current estimated cell flow A(i) is already accepted, A(i) < $A_{max(i)}$ is naturally satisfied.

In order to assure the network to maintain a normal offered load by the above call admission determination, a traffic amount actually generated from each terminal during communication is compared with the declared traffic characteristic value a(j,i) for each time unit Δt(i), thereby checking whether a cell is correctly generated from each terminal. That is, a flow value is constantly monitored by accumulating transmission cells from each terminal within the time unit Δt(i) by a network, e.g., a switch or network terminator (NT1). If the number of transmission cells within an arbitrary time unit Δt(i) exceeds the declared value a(j,i), a declared value "violation" is immediately determined for the terminal, and a regulation sequence is performed, thereby maintaining the network in a normal offered load (a so-called "cell flow monitoring system").

The maximum number of CALL-REQs within an allowable range of communication quality of the accommodated line are accepted by performing the call admission control in each switch in the network in accordance with the above sequence. Therefore, a high-efficiency network having characteristics of asynchronous transfer mode communication can be realized.

In addition, since the traffic characteristics declared by each call j are expressed as the maximum cell flow a(j,i) generated in the time unit Δt(i), a violation in which, e.g., traffic actually generated from each call to be counted exceeds the declared traffic characteristics, i.e., a(j,i) can be immediately and easily monitored. Therefore, when a violation of a certain terminal is detected, the switch performs a certain regulation sequence to maintain the network in a normal offered load.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

Figure 1:
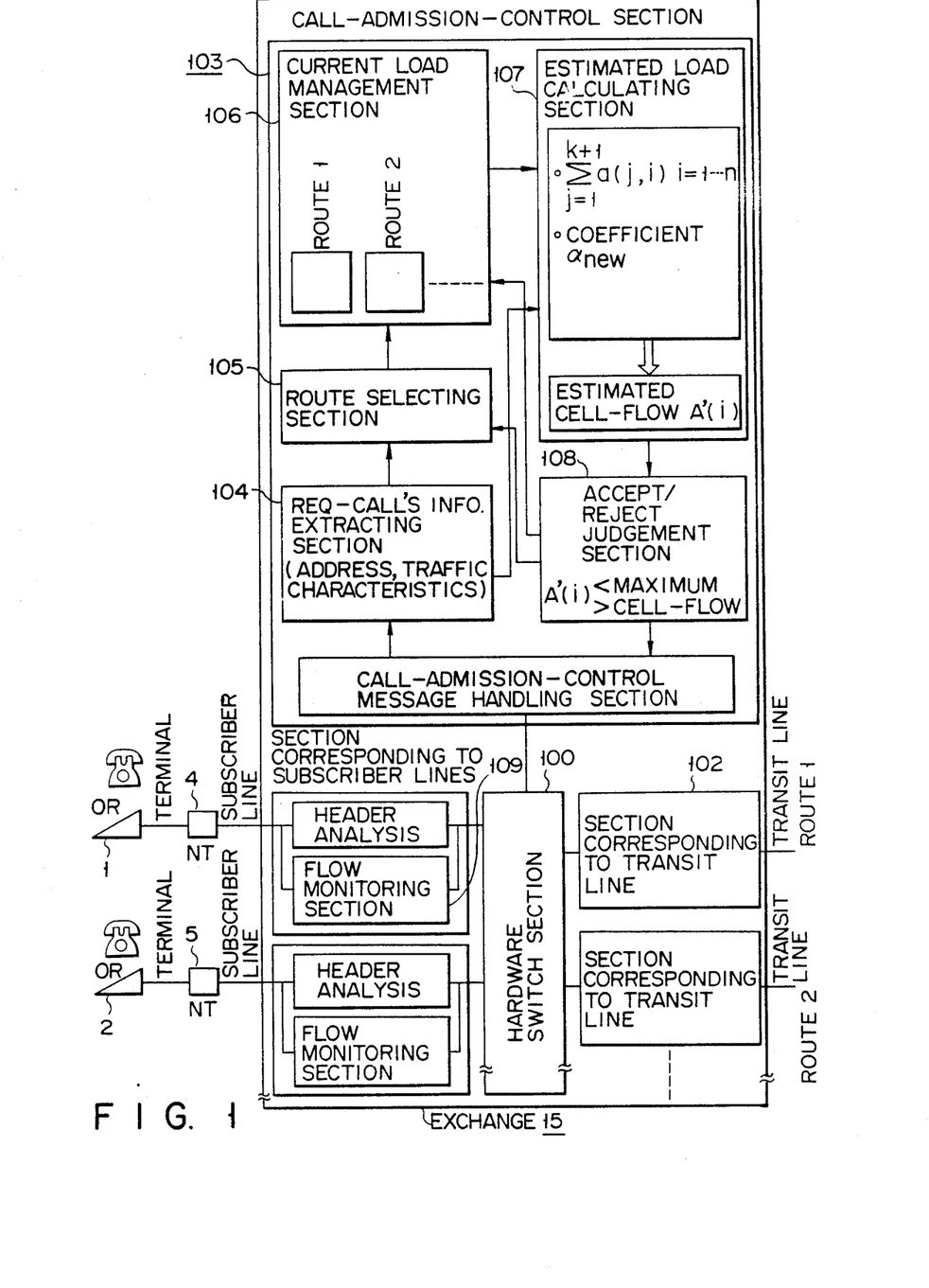
FIG. 1 is a functional block diagram showing an embodiment of a switch according to the present invention.

FIG. 1 is a functional block diagram showing an embodiment of a exchange according to the present invention. Referring to FIG. 1, a hardware switch section 100 for hardware-transferring a cell as a fixed length information block is connected to a section of subscriber line for realizing an interface function with a subscriber's line, a section of transit line 102 for realizing an interface function with a transit line, and a call admission control section 103 for performing call admission control. When the call admission control section 103 receives a CALL SET-UP message sent from a terminal which desires to start communication, e.g., a terminal 1, a request call information extracting section 104 refers to the contents of the message and obtains destination address information and traffic characteristics information of the request call. On the basis of the destination address information, a candidate route selecting section 105 selects an adequate route. The following processing is performed in order to check whether the request call can be admitted to the selected route (in this case, a route 1, a route 2, ...)

First, a current load management section 106 of a transit line corresponding to the selected route is referred, and calls j (j=1 to k) currently transiting through the line and traffic characteristics informations thereof are obtained. As will be described in detail later, the traffic characteristics informations are stored in the form of maximum allowable cell flow a(j,i) (j=1 to k and i=1 to n) which can be transmitted within the time units having n different lengths in the current load management section 106 for each route.

By using the traffic characteristics informations of calls currently transiting, traffic characteristics informations a(k+1,i) (i=1 to n) of a request call (k+1), and a coefficient $\alpha_{new}(i)$ to be described in detail later, a estimated load calculating section 107 calculates an offered load of the line predicted to occur when a request call is accepted as an estimated cell flow $A'(i)$ ($i=1$ to n) to be described in detail later. An accept/reject judgement section 108 checks whether the estimated cell flow $A'(i)$ exceeds a maximum allowable cell flow of line Amax(i) obtained from a circuit capacity and a cell length, thereby determining the accept/reject of the request call. If the request is judged to be acceptable, the call admission control section 103 updates the information of the current load management section 106 and sets a virtual channel id used by the request call for communication and flow monitoring parameters of the call in, e.g., a flow monitoring section 109 in the section of subscriber line.

The terminal 1 accepted the SET-UP Request starts transmission of a cell as communication information through the subscriber's line. The flow supervisor section 109 in the section of subscriber line has a counter for counting the number of transmitted cells of a currently communicating terminal and monitors input cell traffic for each terminal. As will be described in detail later, the flow monitoring section 109 having the counter has a function of monitoring the number of input cells per time units having the n lengths described above. If any terminal transmits cells in a number exceeding the characteristics declared upon set-up, the flow monitoring section 109 detects this and performs a certain regulation sequence, e.g., Disconnecting, etc.

As described above, the offered load of the network is properly maintained by the call admission control and the cell flow monitoring control in the exchange. Note that in the above description, the flow monitoring control function is present in the section of subscriber line in the exchange. The flow monitoring control function, however, may be present in another apparatus (e.g., a network terminator (NT)).

Figure 2:
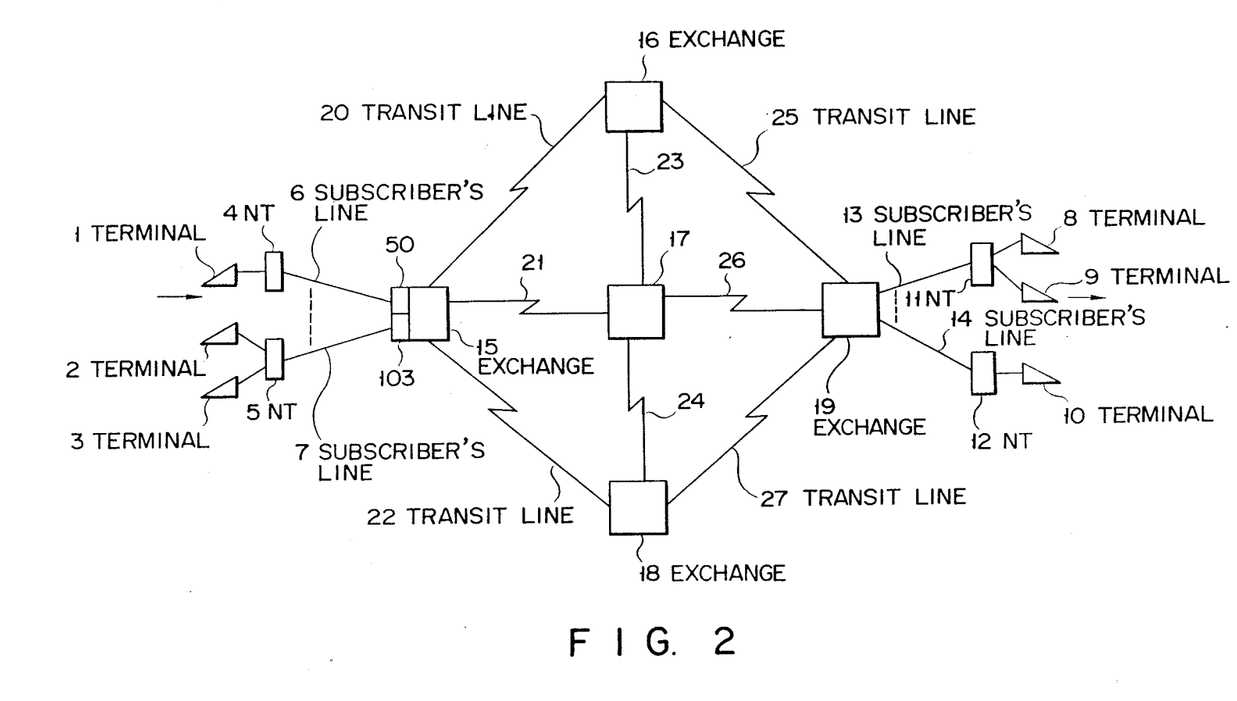
FIG. 2 is a schematic view showing an arrangement of an asynchronous transfer mode network according to the present invention.

FIG. 2 is a schematic view showing an arrangement of an asynchronous transfer mode network according to the present invention.

This network is constituted by exchanges 15 to 19 and transit lines 20 to 27. Each terminal is connected to a public network through a network terminator (NT) and a subscriber's line. For example, the terminals 1 to 3 are connected to the public network via network terminator 4 and 5 and subscriber's lines 6 and 7, and the terminals 8 to 10 are connected to the public network via network terminator 11 and 12 and subscriber's lines 13 and 14.

All information (e.g., control information and user information) are transferred in units of cells on the subscriber's lines and the transit lines.

Figure 3:
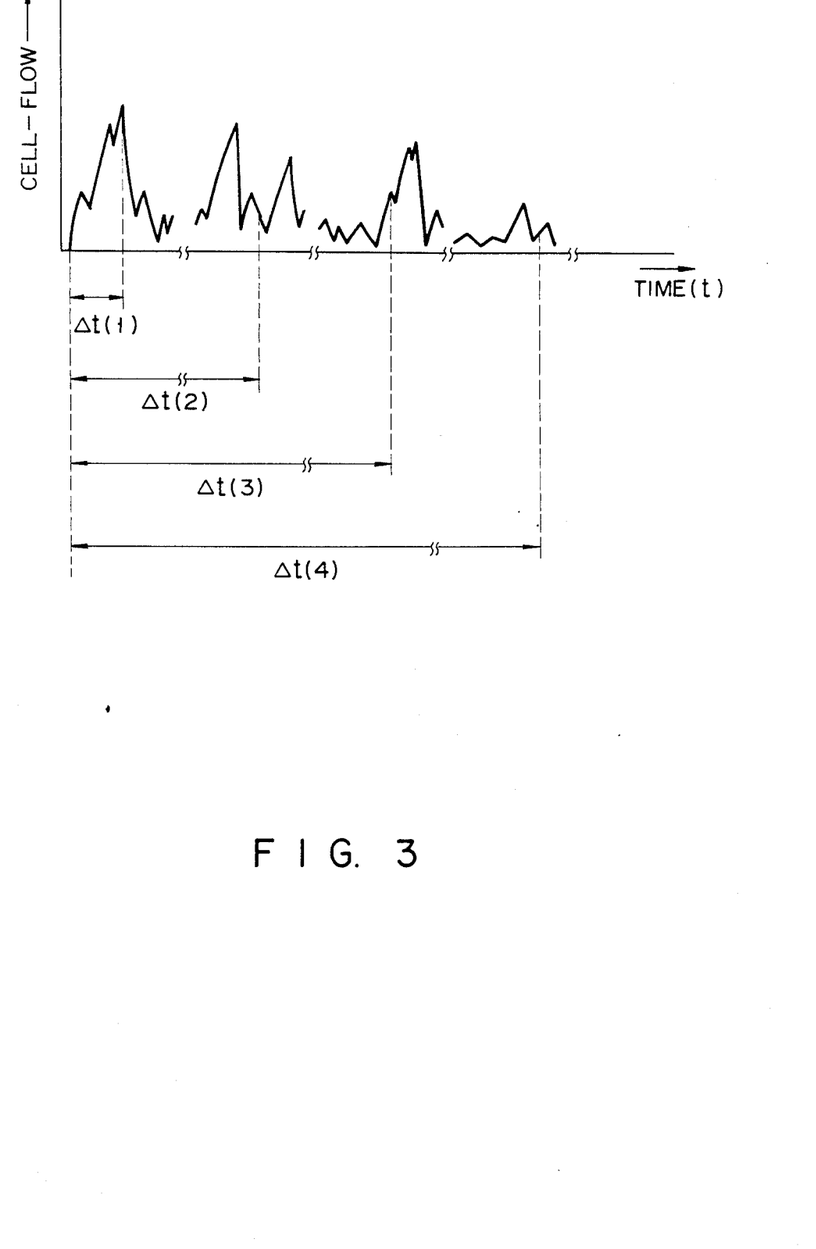
FIG. 3 is a statistical graph showing a change as time passes in cell flow generated by a call.

Assume that the terminal 1 sends a call-setup request to the exchange 15 in order to perform communication from the terminal 1 to the terminal 9 in FIG. 2 and the exchange 15 checks whether the transit line 20 can be selected as a communication path of this call or not. The exchange 15 constantly grasps calls communicated by using the transit line 20 and their traffic characteristics. Assume that calls 1 to k are communicated by using the transit line 20 when the terminal 1 sends call-setup request, and that the traffic characteristics of each call are grasped by the exchange 15 as maximum cell flows $a(j,1)$ to $a(j,4)$ ($j=1, 2, \ldots, k$) generated in four time units from $\Delta t(1)$ to $\Delta t(4)$ ($\Delta t(1) << \Delta t(2) << \Delta t(3) << \Delta t(4)$). FIG. 3 illustrates the examples of change of cell flow generated from call j. In this case, the number of cells per time units $\Delta t(1)$ to $\Delta t(4)$ must be within the values $a(j,1)$ to $a(j,4)$ respectively.

Figure 4A:
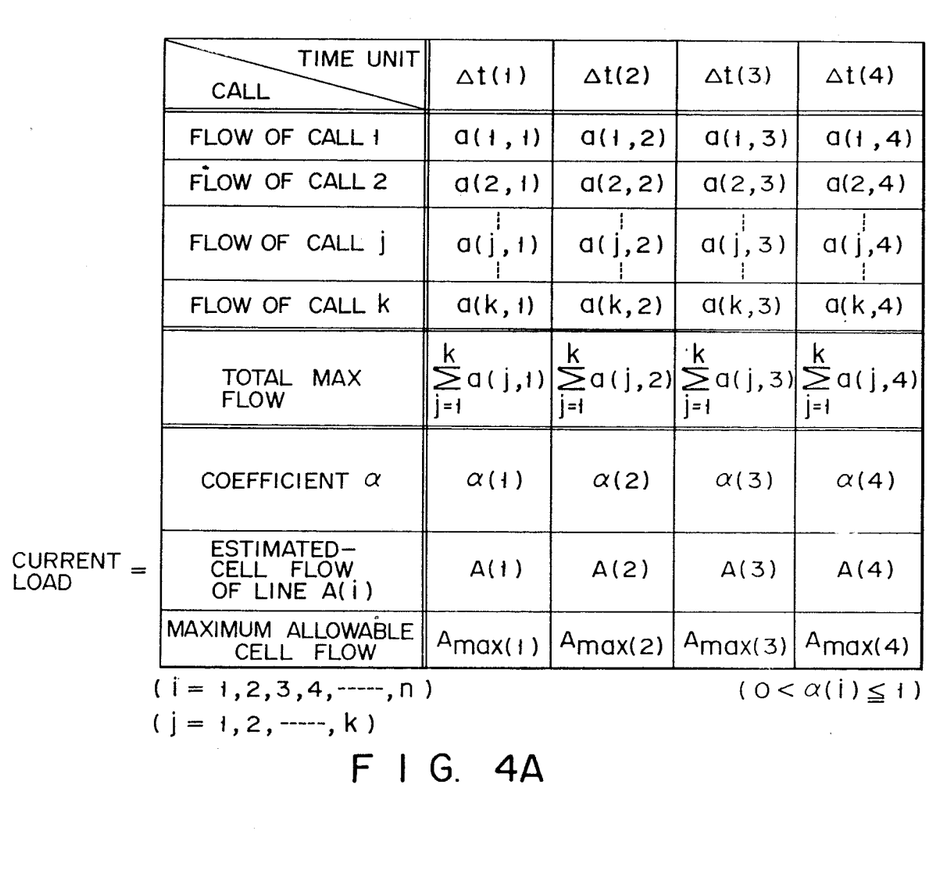
FIGS. 4A and 4B are tables showing a relationship between a declared maximum flow in a time unit Δt(i) of each call, a total-maximum flow before and after a new set-up request call is accepted, coefficient, an estimated cell flow of line, and a maximum allowable cell flow of line.

The exchange 15 calculates a current offered load of the transit line 20 by using the traffic characteristics of the calls 1 to k as shown in a statistical table of FIG. 4A, thereby constantly estimating the current offered load as the estimated cell flow $A(i)$.

A total maximum flow is obtained by simply adding cell flows $a(1,i)$ to $a(k,i)$ ($i=1, 2, 3, 4$) of the k calls for each time unit $\Delta t(i)$ respectively. Assuming that this total maximum flow is an estimated cell flow representing the offered load of the line, however, this estimated amount deviates too much to (is biased toward) a safe side without taking a statistical multiplexing effect into consideration. This is because although each call declares a maximum cell flow $a(j,i)$ per time unit $\Delta t(i)$, actual traffic varies with burstiness and therefore a maximum flow is not always supplied.

Therefore, values obtained by multiplying the above total flow by coefficients $\alpha(1)$ to $\alpha(4)$ ($0 < \alpha(i) \leq 1$) are used as estimated cell flows $A(1)$ to $A(4)$ of the line.

Generally, the value of the coefficient $\alpha(i)$ must be reduced as the statistical multiplexing effect is increased and must become close to 1 as the statistical multiplexing effect is reduced.

The value of $\alpha(i)$ can be in inverse proportion to the permitted cell loss rate.

Considering more specifically, on the basis of the statistical multiplexing effect, it is assumed that the coefficient $\alpha(i)$ is reduced as the time unit $\Delta t(i)$ is reduced. This is because as the time unit $\Delta t(i)$ is reduced, an actual cell flow value of an individual call j during a time unit $\Delta t(i)$ becomes unstable and largely varies and therefore a difference between a declared maximum cell flow $a(j,i)$ and an actual flow value tends to be increased, but as the time unit $\Delta t(i)$ is increased, a variation in actual cell flow value during a time unit $\Delta t(i)$ is reduced to be comparatively close to a declared maximum cell flow. If the length of a time unit is infinitely increased, a declared maximum cell flow and an actual cell flow during the time unit becomes substantially equal to each other, and this value corresponds to an average rate of the call.

On the basis of the statistical multiplexing effect, value of coefficient $\alpha(i)$ may become smaller according to the number of multiplexing of calls.

The permitted cell loss rate which is regulated in each network, becomes bigger as the value of $\alpha(i)$ becomes smaller.

By the above method, the exchange 15 can grasp the current offered load of the transit line 20 as, e.g., the estimated cell flows $A(1)$ to $A(4)$ in the four time units $\Delta t(1)$ to $\Delta t(4)$.

This estimated cell flow $A(i)$ should be smaller than the maximum allowable cell flow of line $A_{max(i)}$ obtained from the circuit capacity of the line 20 in each time unit. (That is, $A(i) < A_{max(i)}$).

Figure 4B:
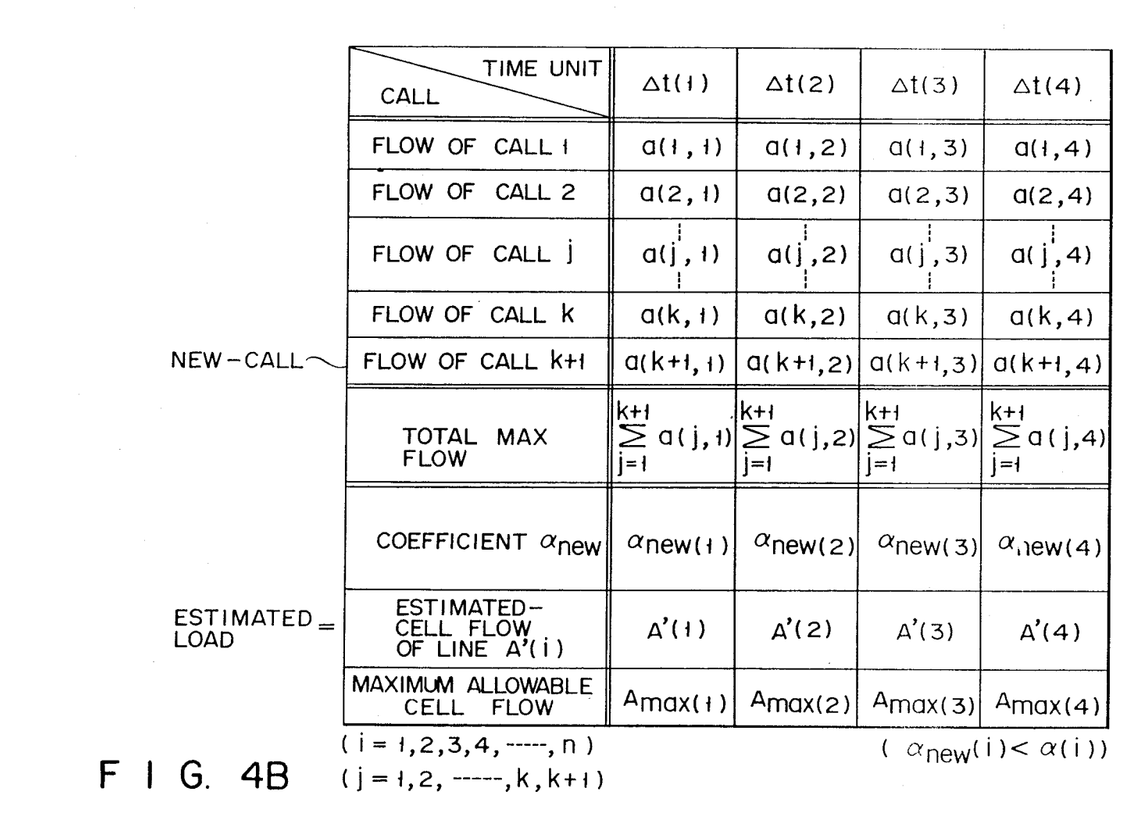

As indicated in FIG. 4B, if a new set-up request call $k+1$ is generated, in order to check whether the call $k+1$ can be accommodated in the transit line 20, estimated cell flows $A'(1)$ to $A'(4)$ predicted assuming the call is accepted are calculated as follows.

In this case, the traffic characteristics of the new request call $(k+1)$ are expressed as maximum cell flows $a(k+1,1)$ to $a(k+1,4)$ generated in $\Delta t(1)$ to $\Delta t(4)$. A new total maximum flow obtained by adding the above values to a total flow of declared maximum cell flows in each time unit of the already connected k calls is calculated by the following equation:

$$\sum_{j=1}^{k+1} a(j,i) \quad \text{where } i = 1, 2, 3, 4$$

The above total flow in each time unit is multiplied by coefficients $a_{new}(i)$ ($i = 1, 2, 3, 4$) respectively, thereby obtaining $a_{new}(i) \times \Sigma a(j,i) = A'(i)$.

By the above calculations, the estimated cell flows $A'(1)$ to $A'(4)$ predicted assuming that the request call is accepted are obtained.

Note that although the coefficients $a_{new}(i)$ ($i = 1, 2, 3, 4$) to be used when the request call is accepted basically differ from the coefficients $a(i)$ ($i = 1, 2, 3, 4$) used when only the calls 1 to k are present, it is difficult to correctly obtain proper values. Therefore, on the basis of the value $\Delta t(i)$ or the permitted cell loss rate, fixed values may be set to a certain degree.

The estimated cell flows $A'(1)$ to $A'(4)$ are compared with the transmittable maximum allowable cell flows of line $A_{max(i)}$ obtained from the circuit capacity of the transit line 20 in the time units $\Delta t(1)$ to $\Delta t(4)$. If the former is smaller than the latter, the network accepts the set-up request. That is, according to the method of the present invention, determination of admission (accept or reject) of a request call on the transit line 20 is performed in accordance with the above calculation/determination sequence (steps) and algorithm. A predicted offered load of the transit line obtained immediately after the set-up request is accepted by the above method is indicated as estimated cell flow in the table shown in FIG. 4B.

Figure 5:
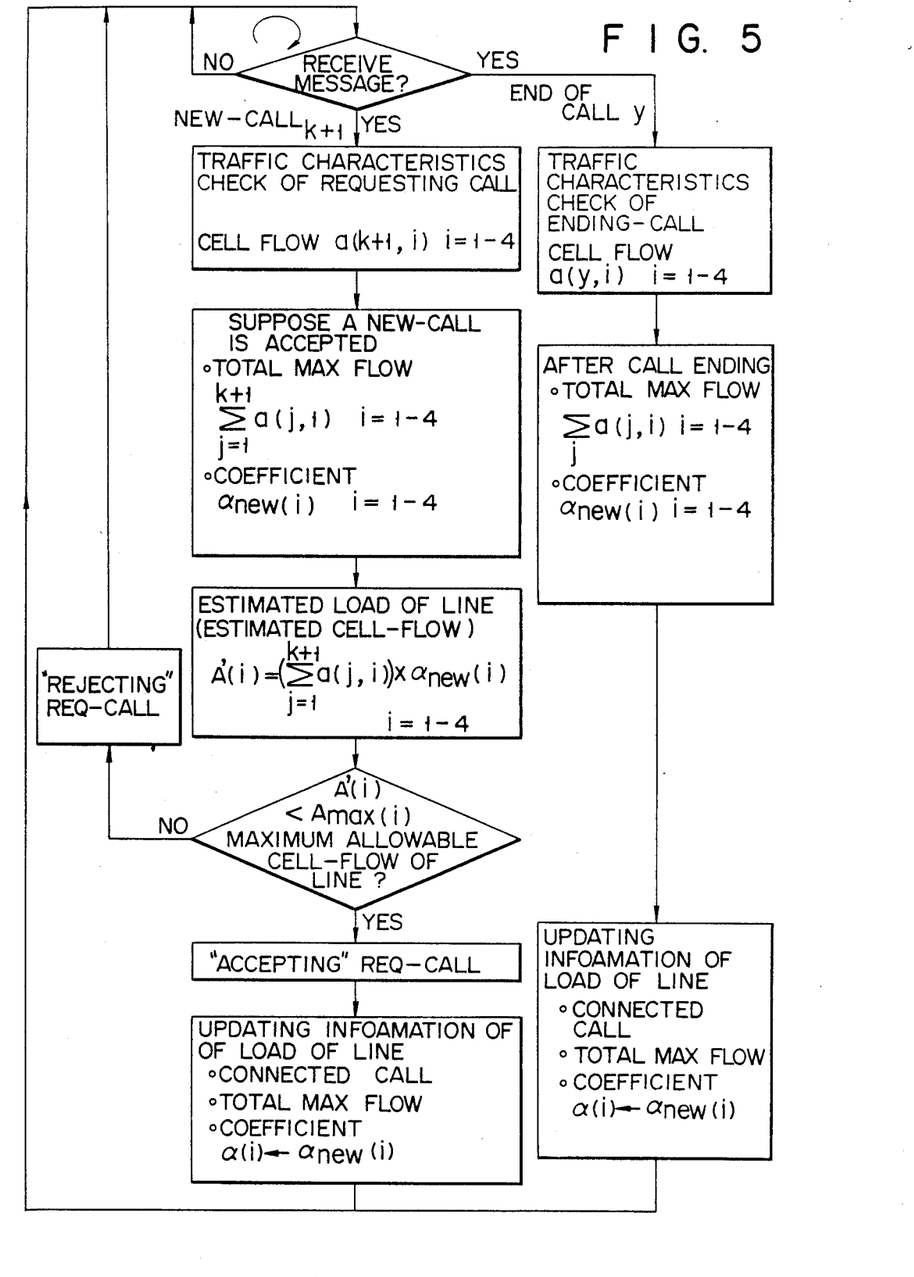
FIG. 5 is a flow chart for explaining call admission determination processing steps concerning an arbitrary line.

FIG. 5 is a call acceptance determination flow chart for explaining a determination sequence (steps) for checking whether a new set-up request call can be accommodated in a certain transit line. In accordance with the sequence as shown in FIG. 5, an offered load state of the line is always calculated and stored, and a new acceptable call is properly accepted. In addition, line load information is updated each time communication of a connected call is finished.

Figure 6:
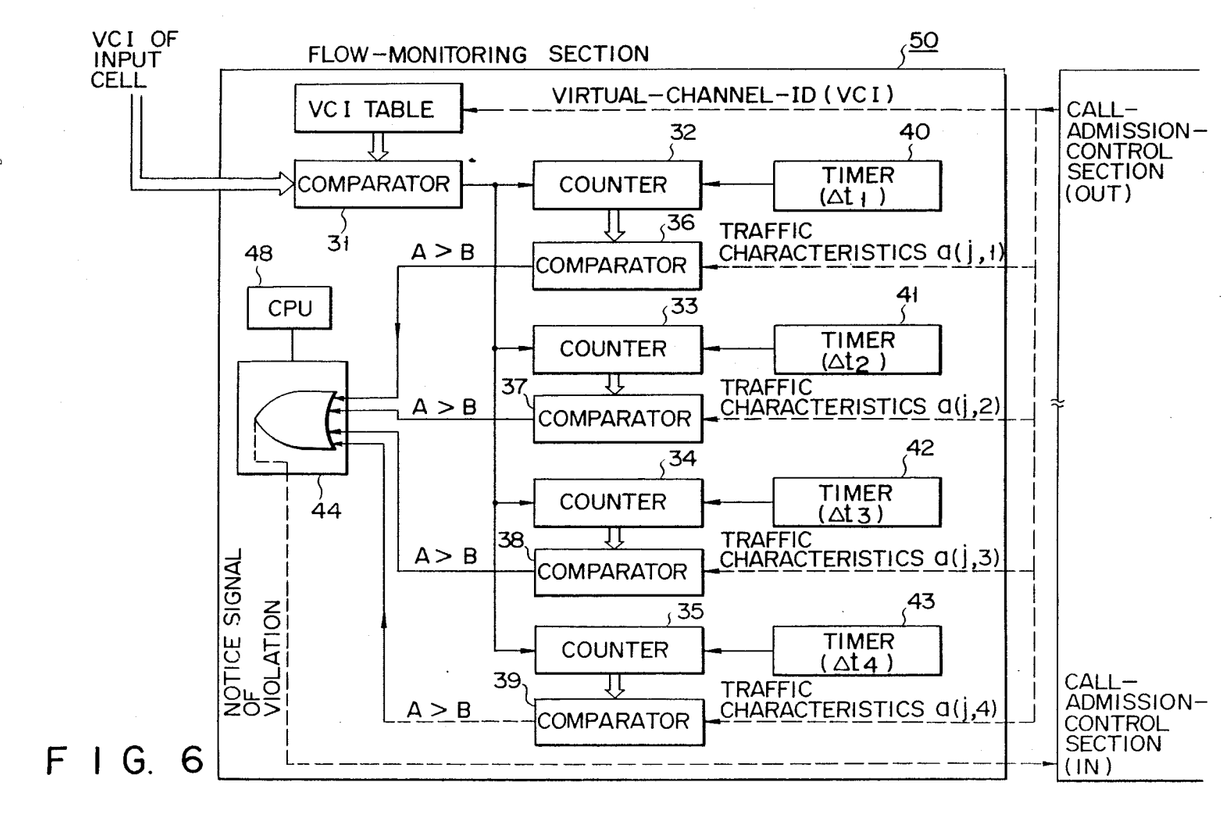
FIG. 6 is a functional block diagram showing an embodiment of a cell flow monitor which constitutes a part of a switch or an NT and monitors a cell flow in units of virtual channels.

FIG. 6 is a block diagram of an apparatus representing an embodiment of a method of monitoring whether traffic characteristics of a terminal are keeped during communication. This apparatus functions as, e.g., a cell flow monitoring section constituting a part of a exchange and monitors the flow of each virtual channels in accordance with the following flow monitoring method.

That is, as in the above embodiment, the traffic characteristics of a terminal are expressed as a maximum cell flow $a(j,i)$ in four time units $\Delta t(1)$ to $\Delta t(4)$. A virtual channel id (VCI) for identifying a logical circuit (channel) is assigned to sending/receiving data upon set-up (e.g., CALL SET-UP) of each terminal. In a network wherein a cell having a data format in which the VCI is always included in a cell-header is sent/received, the cell flow monitoring unit monitors a current flow in each of time units $\Delta t(1)$ to $\Delta t(4)$ for each virtual channel during communication. If the current flow is in conflict with a declared value $a(j,i)$ (i.e., if the counted cell flow exceeds the declared maximum cell flow), the cell flow monitoring unit immediately performs a certain regulation sequence. For example, a violation notice signal is directly sent to a violating terminal to request the terminal for regulation. Or the violation notice signal is sent to a call control unit of the exchange and the call control unit disconnects connection of the violating terminal. OR cell corresponding to a violation flow is forcibly discarded by the exchange.

More specifically, a comparator 31 shown in FIG. 6 increments counters 32 to 35 when a VCI of a cell input from a terminal coincides with a VCI as an object of flow monitoring designated by the call admission control section. The counters 32 to 35 are reset at periods ($\Delta t(1)$ to $\Delta t(4)$) set in timers 40 to 43, respectively.

Each of comparators 36 to 39 constantly compares a value CT(i) of the counter with a maximum flow $a(j,i)$ as a characteristic value of the terminal. If $CT(i) > a(j,i)$ is obtained, each of the comparators 36 to 39 sends an ON signal to a declaration violation detecting section 44.

The declaration violation detecting section 44 calculates a logical OR of the signals from the comparators 36 to 39. Therefore, the detecting section 44 sends a declaration violation signal by using an ON signal sent from one of a plurality of comparators when the counter value of one of the counters 32 to 35 exceeds a declared value as a trigger to the terminal, the call admission control section of the exchange, or the like, thereby activating regulating means.

As has been described above, according to the present invention, a current offered load of a line and traffic characteristics of a terminal can be expressed by using a cell flow in time units having a plurality of predetermined lengths. Therefore, a predicted offered load of the line predicted to be obtained when a new call set-up request is generated can be similarly estimated as a cell flow in time units having a plurality of lengths. Therefore, "accept" or "reject" of admission can be easily determined by comparing the predicted value with a transmittable maximum cell flow of the line. As a result, by using a control algorithm of the present invention upon line selection in call admission control in, e.g., a exchange of a network, a high-efficiency network having characteristics of asynchronous transfer mode communication in which call admission requests are accepted as many as possible within an allowable range of communication quality of lines is realized.

In addition, according to the present invention, traffic characteristics declared by a request call are expressed as a cell flow generated in time units. Therefore, an exchange for instance can constantly easily monitor a violation of a traffic amount generated by each call during communication with respect to the declared traffic characteristics ($a(j,i)$, i.e., a maximum flow of cell within the time unit). If a violation is detected, an exchange of a network, for example, performs a regulation sequence to constantly maintain a correct offered load in the network.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A call admission control method wherein, in a network in which all information generated from terminals having various traffic characteristics are transmitted/switched by a fixed length block called a "cell" having a cell header including a virtual channel id, a terminal requesting communication declares destination address information and traffic characteristics of requested communication to said network upon set-up request, and an exchange in said network performs call processing for a request call on the basis of the destination address information and traffic characteristics declared by said terminal and a current offered load in said network, comprising the steps of:

grasping a current offered load of a line accommodated by said exchange in said network as an estimated cell flow $A(i)$ (i is a positive integer) to be transmitted to said line in time units $\Delta t(i)$ (i is a positive integer of $1, 2, \ldots, n$) having a plurality of (n) predetermined lengths;

grasping traffic characteristics of each call as a maximum cell flow $a(j,i)$ (j is an identification number of a terminal) generated from said terminal in the time units $\Delta t(i)$ having the n lengths;

calculating a predicted offered load of said line predicted to be obtained when the new request call is accepted as an estimated cell flow $A'(i)$ (i is a positive integer) predicted to be transmitted to said line in the time unit $\Delta t(i)$ by using the cell flow $A(i)$ (i is a positive integer) representing the current offered load of said line and the maximum cell flow $a(k+1,i)$ representing the traffic characteristics of new request call;

comparing the estimated cell flow $A'(i)$ with a transmittable maximum allowable cell flow $A_{max(i)}$ of said line obtained from a circuit capacity;

accepting admission of the request call in accordance with the comparison result obtained in said comparison step; and rejecting admission of the request call.

2. A method according to claim 1, wherein the estimated cell flow $A(i)$ (i is a positive integer $1, 2, \ldots, n$) representing a current offered load of said line and the estimated cell flow $A'(i)$ (i is a positive integer) representing a predicted offered load of said line predicted to be obtained when a new request call is accepted are expressed as follows by using traffic characteristics $a(j,i)$ of all calls j (j is a positive integer $1, 2, \ldots, k$) currently transiting on said line, traffic characteristics $a(k+1,i)$ of the request call $k+1$, a current coefficient $\alpha(i)$ ($0 < \alpha(i) \leq 1$), and coefficient $\alpha_{new}(i)$ ($0 < \alpha_{new}(i) \leq 1$) to be used when the new request call is accepted:

$$A(i) = \alpha(i) \times \sum_{j=1}^{k} a(j,i)$$

$$A'(i) = \alpha_{new}(i) \times \sum_{j=1}^{k+1} a(j,i).$$

3. A cell flow monitoring method for monitoring cell flows transmitted from terminals during communication by counting the cell flows in time units $\Delta t(i)$ (i is a positive integer $1, 2, \ldots, n$) having a plurality of lengths, and if the cell flow within the time unit $\Delta t(i)$ exceeds a traffic characteristic value $a(j,i)$ of said terminals grasped beforehand by a network, for immediately determining "violation" and performing a regulation sequence.

* * * * *